United States Patent
Burke et al.

(10) Patent No.: US 7,253,557 B2
(45) Date of Patent: Aug. 7, 2007

(54) LIGHT SOURCE PROVIDED WITH A HOUSING ENCLOSING VOLTAGE REGULATOR MEANS AND METHOD OF MANUFACTURING THEREOF

(75) Inventors: John Burke, New Baltimore, MI (US); Terrence D. Kalley, Troy, MI (US); David Gentit, Farmington Hills, MI (US)

(73) Assignee: Bright Solutions, Inc., Troy, MI (US)

(*) Notice: Subject to any disclaimer, the term of this patent is extended or adjusted under 35 U.S.C. 154(b) by 622 days.

(21) Appl. No.: 10/682,804

(22) Filed: Oct. 10, 2003

(65) Prior Publication Data

US 2004/0150989 A1    Aug. 5, 2004

Related U.S. Application Data

(63) Continuation-in-part of application No. 10/465,778, filed on Jun. 20, 2003, now Pat. No. 7,122,812, which is a continuation of application No. 09/704,543, filed on Nov. 3, 2000, now Pat. No. 6,590,220, which is a continuation-in-part of application No. 09/406,871, filed on Sep. 28, 1999, now Pat. No. 6,355,935, which is a continuation of application No. 08/943,903, filed on Oct. 3, 1997, now Pat. No. 5,959,306, which is a continuation-in-part of application No. 08/598,435, filed on Feb. 8, 1996, now Pat. No. 5,674,000.

(51) Int. Cl.
| | |
|---|---|
| *H01J 5/50* | (2006.01) |
| *H01J 5/62* | (2006.01) |
| *H01J 9/00* | (2006.01) |

(52) U.S. Cl. ............. 313/318.12; 313/48; 313/51; 313/318.01; 445/22; 445/23; 362/306; 362/257; 362/362; 250/504 R; 250/504 H

(58) Field of Classification Search ............. 445/26, 445/27; 313/110–116, 634
See application file for complete search history.

(56) References Cited

U.S. PATENT DOCUMENTS

| | | | |
|---|---|---|---|
| 3,579,075 A | | 5/1971 | Floyd |
| 3,711,700 A | * | 1/1973 | Westlund et al. ........... 362/293 |
| 3,774,030 A | | 11/1973 | O'Connor et al. |
| 3,936,671 A | * | 2/1976 | Bobrick et al. ............ 362/459 |
| 4,047,033 A | | 9/1977 | Malmberg et al. |
| 4,081,764 A | | 3/1978 | Christmann et al. |
| 4,084,905 A | | 4/1978 | Schreiber et al. |

(Continued)

FOREIGN PATENT DOCUMENTS

CA          1331372         8/1994

(Continued)

OTHER PUBLICATIONS

Brochure, Tracer Products, TracerLine® TP-1700, 1995.

(Continued)

*Primary Examiner*—Mariceli Santiago
(74) *Attorney, Agent, or Firm*—Steptoe & Johnson LLP

(57) ABSTRACT

A light source for testing sites using a fluorescent dye is described. The light source can include a low voltage lamp or a low heat generating lamp.

23 Claims, 10 Drawing Sheets

U.S. PATENT DOCUMENTS

| | | | |
|---|---|---|---|
| 4,292,664 A * | 9/1981 | Mack | 362/120 |
| 4,301,372 A | 11/1981 | Giering et al. | |
| 4,317,996 A | 3/1982 | Davis | |
| 4,322,122 A | 3/1982 | Schwartz et al. | |
| 4,382,679 A | 5/1983 | Lee | |
| 4,388,673 A | 6/1983 | Maglica | |
| 4,527,223 A | 7/1985 | Maglica | |
| 4,577,110 A | 3/1986 | MacBride et al. | |
| 4,577,263 A | 3/1986 | Maglica | |
| 4,656,565 A | 4/1987 | Maglica | |
| 4,658,336 A | 4/1987 | Maglica | |
| 4,722,593 A | 2/1988 | Shimazaki | |
| 4,768,390 A | 9/1988 | Baker et al. | |
| 4,780,799 A | 10/1988 | Groh | |
| 4,785,383 A * | 11/1988 | Tarnay | 362/659 |
| 4,804,850 A | 2/1989 | Norrish et al. | |
| 4,819,141 A | 4/1989 | Maglica et al. | |
| 4,823,242 A | 4/1989 | Maglica et al. | |
| 4,839,553 A | 6/1989 | Mellor | |
| 4,849,630 A | 7/1989 | Fukai et al. | |
| 4,897,551 A | 1/1990 | Gersh et al. | |
| 4,967,326 A | 10/1990 | Tatavoosian et al. | |
| 4,983,846 A | 1/1991 | Rios et al. | |
| 5,030,009 A | 7/1991 | Ando et al. | |
| 5,036,444 A * | 7/1991 | Hiles | 362/188 |
| 5,082,629 A | 1/1992 | Burgess et al. | |
| 5,120,979 A | 6/1992 | Mersch | |
| 5,184,044 A | 2/1993 | Thomas | |
| 5,192,510 A | 3/1993 | Zoha et al. | |
| 5,207,502 A | 5/1993 | Maglica | |
| 5,225,333 A | 7/1993 | Krause et al. | |
| 5,226,722 A | 7/1993 | Maglica | |
| 5,260,858 A | 11/1993 | Maglica | |
| 5,274,113 A | 12/1993 | Kang et al. | |
| 5,274,269 A | 12/1993 | DePuydt et al. | |
| 5,308,581 A | 5/1994 | Lippitsch et al. | |
| 5,315,494 A | 5/1994 | Maglica | |
| 5,330,073 A | 7/1994 | Collins et al. | |
| 5,336,714 A | 8/1994 | Krutak et al. | |
| 5,347,438 A | 9/1994 | Lerner | |
| 5,349,506 A | 9/1994 | Maglica | |
| 5,357,782 A | 10/1994 | Henry | |
| 5,390,091 A | 2/1995 | Maglica | |
| 5,396,325 A | 3/1995 | Carome et al. | |
| 5,399,499 A | 3/1995 | Paz-Pujalt et al. | |
| 5,421,192 A | 6/1995 | Henry | |
| 5,422,495 A | 6/1995 | Cohn | |
| 5,440,919 A | 8/1995 | Cooper | |
| 5,490,971 A | 2/1996 | Gifford et al. | |
| 5,535,230 A | 7/1996 | Abe | |
| 5,582,705 A | 12/1996 | Yeung et al. | |
| 5,604,406 A * | 2/1997 | Gaus | 315/56 |
| 5,635,817 A | 6/1997 | Shiska | |
| 5,650,563 A | 7/1997 | Cooper et al. | |
| 5,674,000 A | 10/1997 | Kalley | |
| 5,742,066 A | 4/1998 | Cavestri | |
| 5,788,364 A | 8/1998 | Cooper et al. | |
| 5,816,692 A | 10/1998 | Cooper et al. | |
| 5,905,268 A | 5/1999 | Garcia et al. | |
| 5,959,306 A | 9/1999 | Kalley et al. | |
| 5,975,712 A | 11/1999 | Shiao | |
| 5,997,154 A | 12/1999 | Cooper et al. | |
| 6,095,661 A | 8/2000 | Lebens et al. | |
| 6,140,776 A | 10/2000 | Rachwal et al. | |
| 6,200,134 B1 | 3/2001 | Kovac et al. | |
| 6,255,118 B1 | 7/2001 | Alfano et al. | |
| 6,293,911 B1 | 9/2001 | Imaizumi et al. | |
| 6,327,897 B1 | 12/2001 | Scaringe et al. | |
| 6,355,935 B1 | 3/2002 | Kalley et al. | |
| 6,362,488 B1 | 3/2002 | Cabrera et al. | |
| 6,491,408 B1 | 12/2002 | Cooper et al. | |
| 6,537,211 B1 | 3/2003 | Wang et al. | |
| 6,590,220 B1 | 7/2003 | Kalley et al. | |
| 6,694,158 B2 | 2/2004 | Polak | |
| 6,762,419 B1 | 7/2004 | Kranz | |
| 2003/0123254 A1 | 7/2003 | Brass et al. | |
| 2003/0135092 A1 | 7/2003 | Cline et al. | |
| 2003/0173525 A1 | 9/2003 | Seville | |

FOREIGN PATENT DOCUMENTS

| | | |
|---|---|---|
| CA | 2185544 | 9/1995 |

OTHER PUBLICATIONS

Brochure, Tracer Products, TracerLine® TP-1800, 1996.
Brochure, Leak Detection, p. 19.
Brochure, Imata, 1997, No. 3, p. 12.
Brochure, Spectronics Corporation, TP-1400.
Brochure, Bright Solutions, Inc., "12 Volt High Intensity Ultraviolet Lamps", SSL-6-92.
Brochure, H.B. Fuller Company, Fluoro-Lite® Products.
Brochure, Tx; SuperTech, BluLite™ System, Apr. 1994.
Brochure, Cliplight Manufacturing Company, Ultralite™.
Brochure, Tracer Products, TracerLine® UV-Fluorescent Leak Detection, May 1996.
Brochure, Spectronics Corporation, SpectroLine® E-Series Ultraviolet Hand Lamps.
Brochure, Spectronics Corporation, SpectroLine® Fluorescent Leak Detection System.
Brochure, Bright Solutions, Inc., Stay-Brite® Super-Concentrated Fluorescent A/C Leak Detection Dyes, Catalog No. 9603, 1996.
"Like No Other Flashlight . . . ", Lightwave 2000 Catalog, <http://www.longlight.com/>, Oct. 25, 2000.
"The History of LED Technology", <http://marketchopto.com/HistoryofLEDTech.htm>, Oct. 25, 2000.
"Kwality Electronics Industries", <http://www.kwalityindia.com/electronics.html>, Oct. 25, 2000.
"The LED Flashlight Comparison", <http://www.acion-electronics.com/ledcompare.htm>, Oct. 25, 2000.
Souw et al., "Spectroscopic Measurements of the Velocity Distribution of Neural Particles in a Plasma in Front of a Wall," J. Plasma Physics 27, 277, 1983.

* cited by examiner

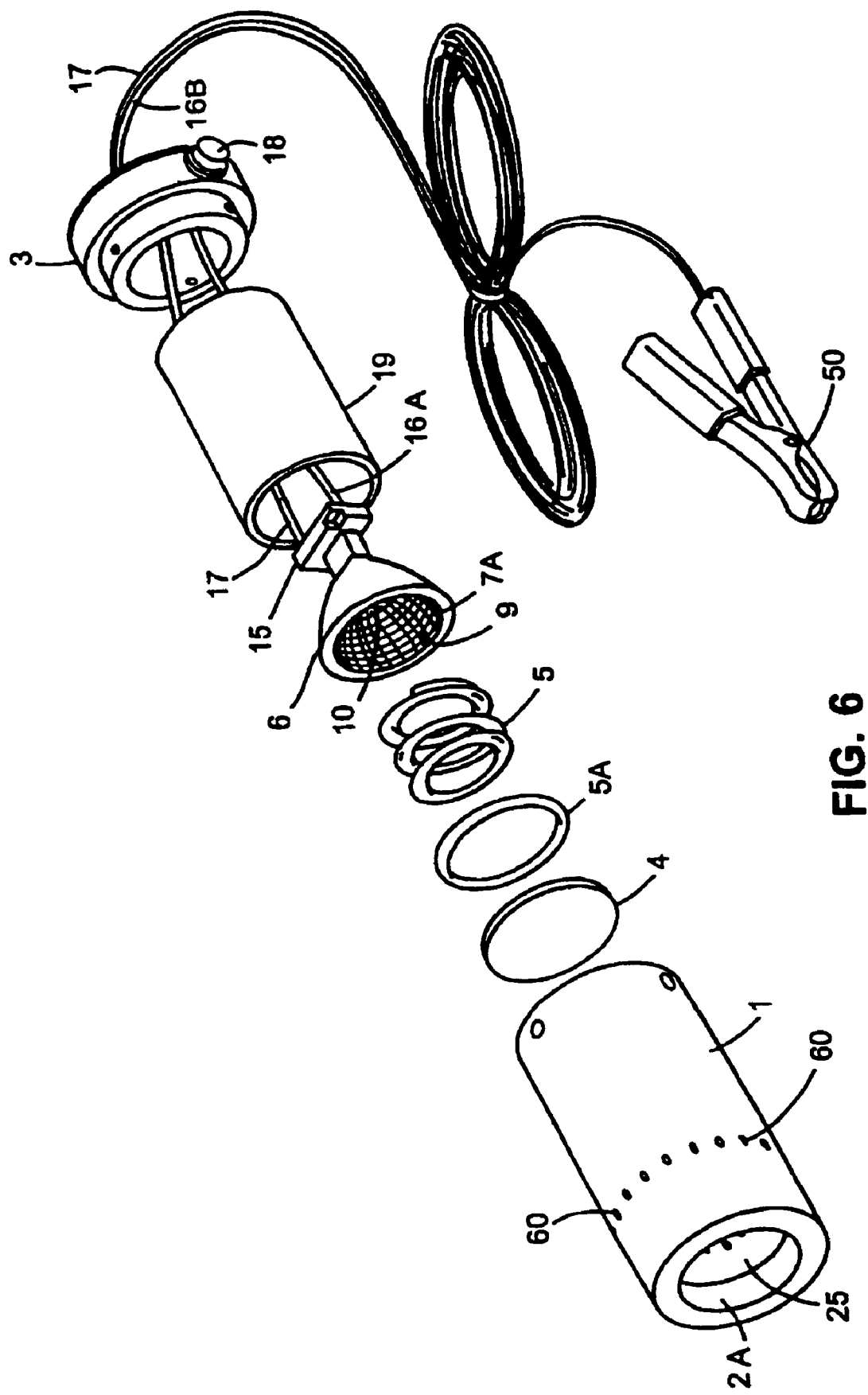

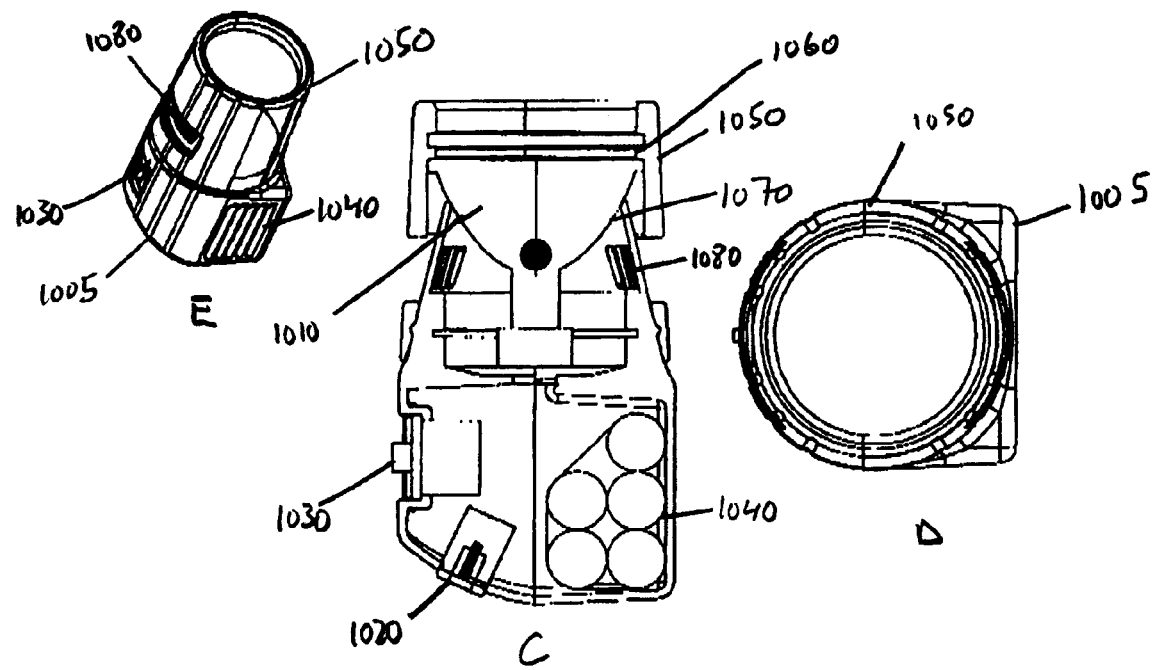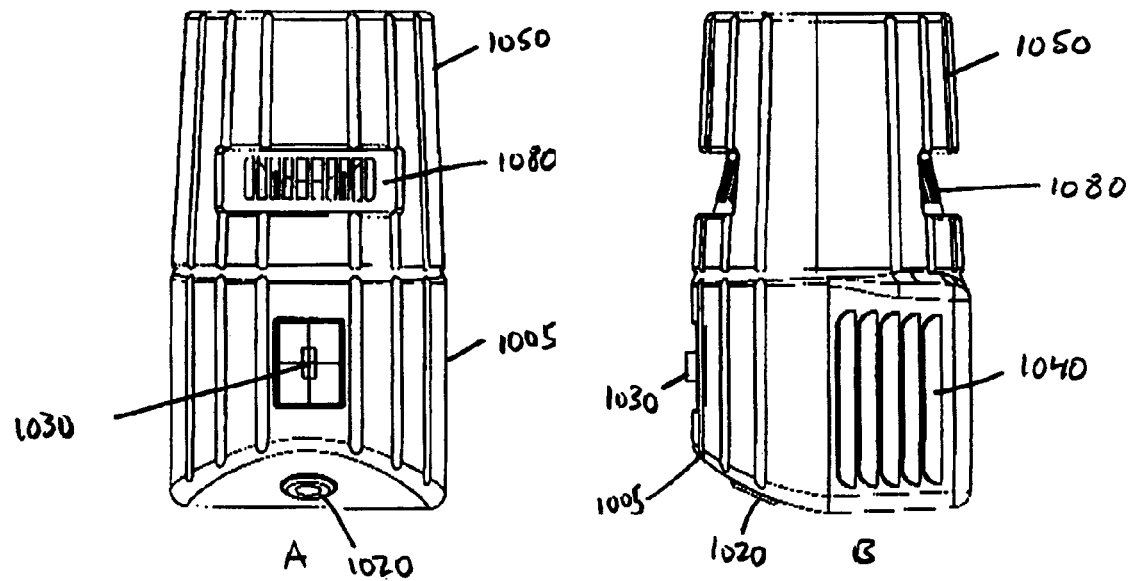
FIG. 10 A-E

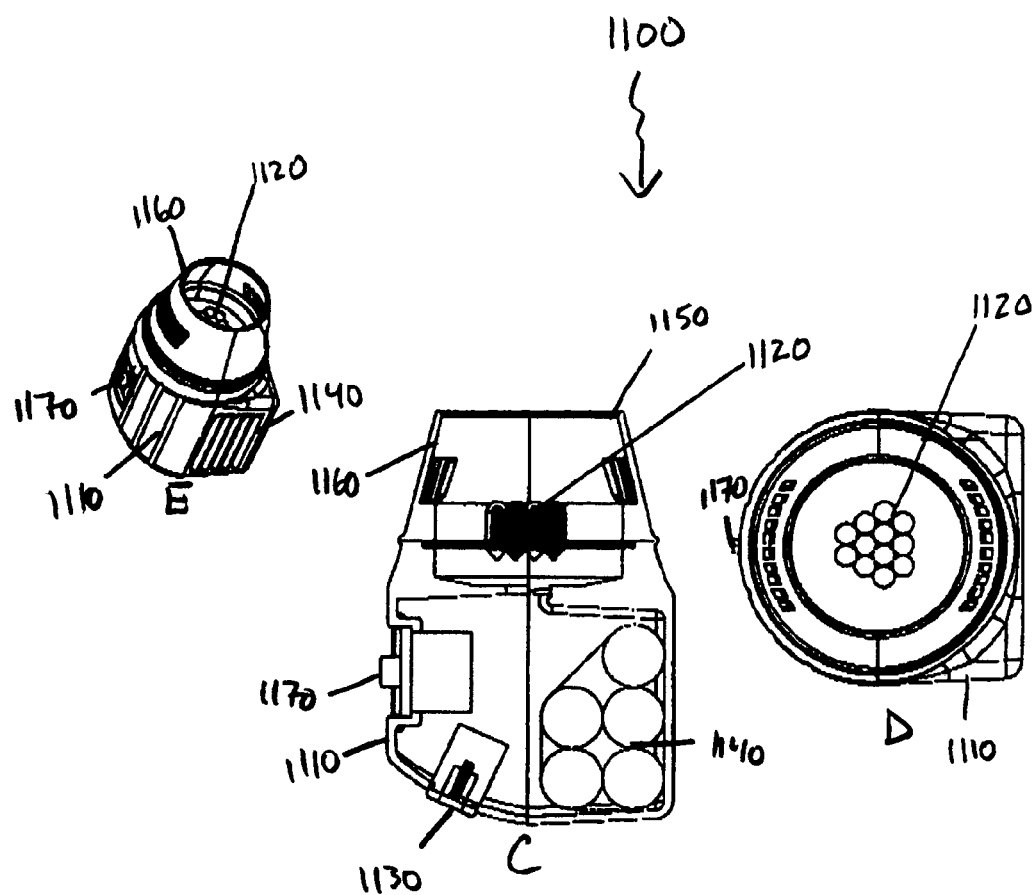
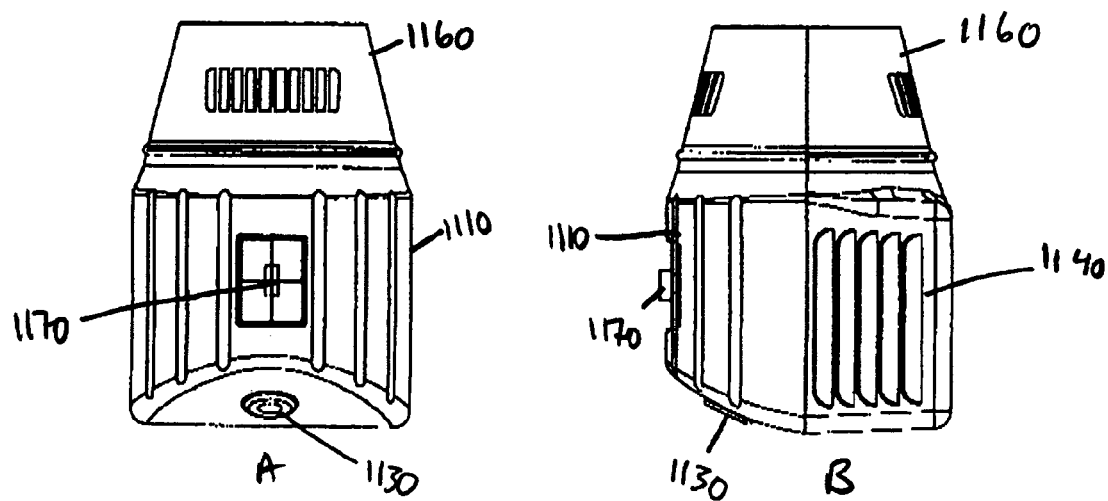
FIG 11 A-E

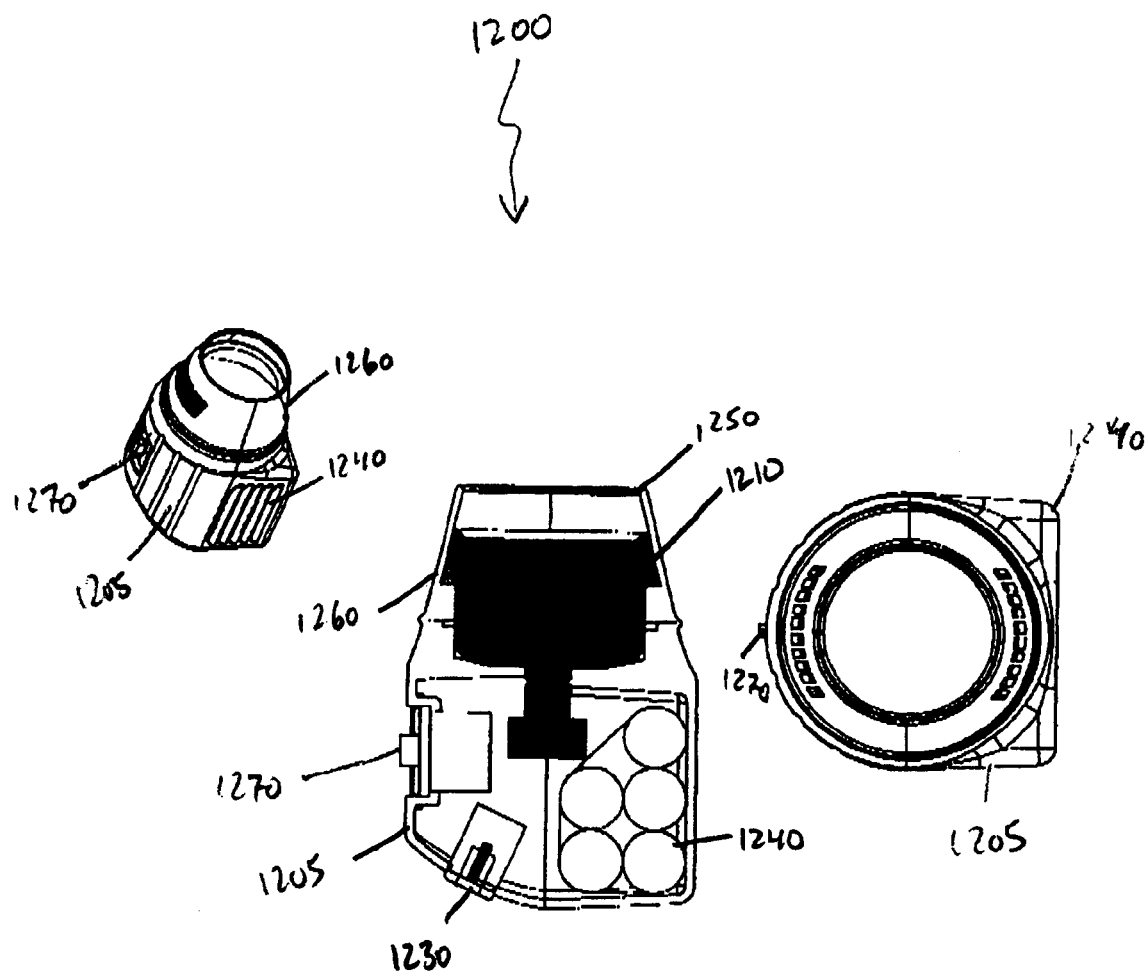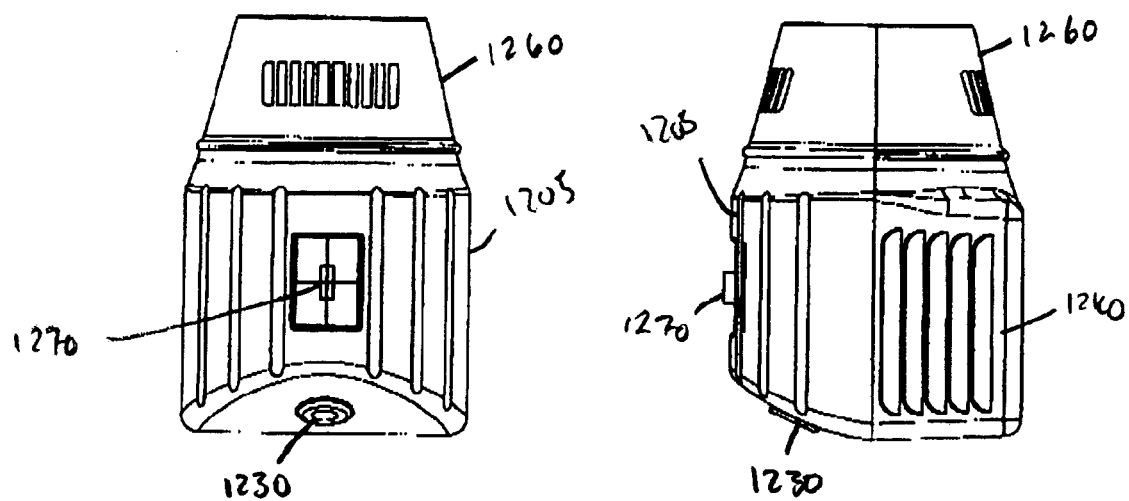
FIG. 12 A-E

LIGHT SOURCE PROVIDED WITH A HOUSING ENCLOSING VOLTAGE REGULATOR MEANS AND METHOD OF MANUFACTURING THEREOF

CROSS REFERENCE TO RELATED APPLICATIONS

This application is a continuation-in-part of U.S. Ser. No. 10/465,778, filed Jun. 20, 2003, now U.S Pat. No. 7,122,812 which is a continuation of U.S. Ser. No. 09/704,543, filed Nov. 3, 2000, now U.S. Pat. No. 6,590,220, which is a continuation-in-part of U.S. Ser. No. 09/406,871, filed Sep. 28, 1999, now U.S. Pat. No. 6,355,935, which is a continuation of U.S. Ser. No. 08/943,903, filed Oct. 3, 1997, now U.S. Pat. No. 5,959,306, which is a continuation-in-part of U.S. Ser. No. 08/598,435, filed Feb. 8, 1996, now U.S. Pat. No. 5,674,000, each of which is incorporated by reference in its entirety.

TECHNICAL FIELD

The invention relates to a light source and system for detecting leaks in fluid systems using light-emitting substances.

BACKGROUND

Leak detection methods have been developed to analyze fluid systems (e.g., climate control systems such as heating, cooling, ventilating, and air conditioning systems, hydraulics, engine oil systems, automatic transmission systems, fuel systems, brake systems, or radiator coolant systems) using dyes. Some methods operate by adding emissive substances (e.g., fluorescent dyes) to the refrigerants and/or lubricants of the fluid system. Suitable dyes include naphthalimide, perylene, thioxanthane, coumarin, or fluorescein, and derivatives thereof. Leaks can be detected by observing fluorescence of the dye at leak sites resulting from excitation of the dye with a light source having particular illumination characteristics (e.g., wavelength, intensity, or beam spread). Examples of leak detection methods are described in U.S. Pat. Nos. 5,357,782 and 5,421,192 which issued to Richard G. Henry on Oct. 25, 1994, and Jun. 6, 1995, respectively, both of which are assigned to the same assignee as the assignee of the present application. Similar fluorescence methods can be used in the non-destructive testing industry.

In the field of leak detection, crack detection, and related non-destructive testing, different dyes can be utilized which fluoresce at different wavelengths. Fluorescence is the Suitable light sources for use in fluorescence detection emit light of wavelengths suitable to excite the dye and cause light emission. The visibility of the fluorescence from the dye can be increased when the leaks are illuminated with light having a wavelength between 300 and 700 nanometers. In general, the dyes fluoresce brightly when excited by light sources which emit light in the 300 to 500 nanometer range.

Typical light sources used in these types of applications include alternating current lamps operating on either 110 to 220 volts, such as the PAR 38, manufactured by Phillips. These lamps had power outputs in the 100 to 200 watt range and produced a substantial amount of light outside of the wavelength range desired to produce a good fluorescence signal. These lamps also created a large amount of heat and required the use of a ballast which provided additional bulk and weight. Self-ballasted lamps were also developed that had relatively long warm-up periods and were very sensitive to voltage surges.

SUMMARY

In general, the invention features a light source that is small, portable, and light weight. The light source produces a narrow emission beam of light. The light source produces light having a wavelength that can effectively excite emissive substances used in leak detection systems. The light source can have a low-voltage lamp or a low heat generating lamp, such as a light emitting diode (LED).

In one aspect, the invention features a light source for examination of a substance which emits light at a wavelength greater than a wavelength of light emitted from the light source when the substance is excited by the wavelength of light emitted from the light source. The light source includes a housing having a light outlet, a reflector located within the housing, a lamp positioned in the housing between the reflector and light outlet, and a filter positioned in the housing between the lamp and the light outlet. Accordingly, the wavelength of the light emitted from the light source through the light outlet is restricted to a predetermined range effective to enhance the detection of emission of light from a substance when the substance is excited by the wavelength of light emitted from the light source. The preferred lamp is a low-voltage lamp (e.g., a halogen lamp). The preferred reflector is a parabolic reflector.

In another aspect, the invention features a light source for examination of a substance which emits light at a wavelength greater than a wavelength of light emitted from the light source when the substance is excited by the wavelength of light emitted from the light source. The light source includes a housing having a light outlet, and a low-voltage lamp positioned in the housing and oriented to emit light through the light outlet. The lamp is capable of being connected to a source of electrical power. The low-voltage lamp emits light of a wavelength within a predetermined range effective to enhance the detection of emission of light from a substance when the substance is excited by the wavelength of light emitted from the lamp. The low-voltage lamp can be a low heat generating lamp. The low-voltage lamp can be a light emitting diode.

In another aspect, the invention features a light source including a housing having a light outlet, and a low heat generating lamp positioned in the housing and oriented to emit light through the light outlet.

A filter can restrict the wavelengths of light emitted from the lamp and the light reflected by the reflector. In embodiments including a filter can employ an absorption filter, dichroic filter, or other interference filter. The filter can be part of the glass that surrounds the element of the lamp.

The lamp is capable of being connected to a source of electrical power, such as a battery, battery pack, or transformer. The reflector can be a dichroic reflector. The reflector can have a faceted surface or a smooth surface. The reflector can substantially reflect a selected wavelength of the light emitted from the lamp. For example, the reflector can reflect light primarily in the blue wavelength range, in the ultraviolet wavelength range, or in the blue and ultraviolet wavelength ranges.

In another aspect, the invention features a system for detecting leaks in fluid systems. The system includes a substance capable of emitting an emission wavelength of light after being excited by an excitation wavelength of light, and the light source, which is capable of emitting the excitation wavelength of light.

The substance can be an emissive leak detection dye, such as a naphthalimide, perylene, thioxanthane, coumarin, or fluorescein.

The system can include a filter lens for detecting the emission wavelength of light, where the emission wavelength of light emitted is enhanced by the utilization of filter lens by an observer of the emission wavelength. The filter lens can be incorporated in eyewear or a shield. The shield can be hand-held or mounted directly on the light source. When mounted on the light source, the observer can view the emission wavelength through the mounted filter lens.

The low-voltage lamp can be a high color temperature, low voltage bulb, such as, for example, a quartz halogen-xenon bulb. Small, direct current lamps of the halogen type, or similar lamps rich in gases such as xenon require no ballast, are small in dimension, are light weight, and are typically not subject to voltage surges or spiking. The low-voltage lamps provide portability. Alternatively the low-voltage lamp can be an LED or an array of LEDs.

The low-voltage lamps can be powered by batteries (e.g., 4.5V, 6V, 9V, or 12V batteries) or battery packs. The batteries or battery packs can be rechargeable. In other embodiments, the low-voltage lamp can be powered by a transformer.

Reflectors can be used to adjust the output wavelengths of light from the low-voltage lamp so that sufficient light power density (i.e., candle power density) reaches the emissive substance. The light source can include a reflector. The reflector can be a focusing reflector or a parabolic reflector. The parabolic shape of the reflector geometry can create a collimated beam consisting of parallel beams of light. The collimated beam can provide a relatively constant illumination intensity over the leak detection area.

The parabolic reflector has a three-dimensional paraboloid shape. A lengthwise cross-section of a parabolic reflector reveals a parabolic shape having a focal point. In a parabolic reflector, light rays emanating from the focal point are reflected by the surface of the paraboloid in a direction parallel to the lengthwise axis of the reflector to form the collimated beam. Because the rays are parallel, they do not noticeably diverge or converge with distance. As a result, the energy density of the light is relatively constant at short (e.g., 1 foot), medium (e.g., 3-5 feet) and long distances (e.g., up to about 100 feet) from the lamp.

The paraboloid can be described by the formula $$Z=(X^2+Y^2)/2R$$

where Z is the lengthwise axis, X and Y are the perpendicular Cartesian axes, and R represents the focal point. The focal point can be between about 0.005 inches and about 2.00 inches, preferably between about 0.01 inches and about 1.50 inches. The lengthwise axis can be between about 0.3 inches and about 8 inches, preferably between about 0.5 inches and 6 inches. The corresponding diameter of the paraboloid is between about 0.50 inches and about 8 inches, preferably between about 0.75 inches and about 3 inches. The lamp is located at or near the focal point.

The reflector can have faceted or smooth surfaces to further modify light distribution. The faceted arrangement can improve the distribution of the light, or can smooth or break up light-dark edges. Facets on the surfaces of the reflector can range from fine, scarcely visible grains to clearly visible faceting, with the effect being correspondingly less or more pronounced. The reflectors can be metal (e.g., aluminum), glass, or plastic. The glass or plastic reflectors can be coated (e.g., with a metal) to obtain the particular reflective properties. The coatings can be applied, for example, by vapor deposition or plating.

Detection of fluorescence can be enhanced when the wavelength of the light emitted from the light source is restricted so that little or no light of the emission wavelength comes from the light source (e.g., little or no light beyond the excitation wavelength, extending into the visible region). The wavelength of the light emitted from the light source can be controlled by use of reflectors with faceted surfaces or dichroic coatings. The wavelength can be further influenced by passing the light through a filter before it exits the light source.

Dichroic coatings produce their reflection properties through the phenomenon of interference. The dichroic coatings consist of multiple (e.g., up to several dozen) thin layers, each only a quarter of a wavelength of the light thick, alternating between materials of a high and low refractive index. Fine tuning of the thicknesses of the layers and the way they are combined enable virtually any reflection curve to be created. The maximum reflectivity is nearly 100%, and there is virtually no absorption of radiation in the regions of low reflectivity. Accordingly, dichroic reflectors are substantially loss-free; the light that is not reflected is passed through the reflector or absorbed by the reflector.

Among the best known members of the dichroic family are the cold-light reflectors which reflect visible light between about 300 and 750 nanometers and allow radiated heat to pass unhindered through the glass. This arrangement greatly reduces thermal load on the illuminated surface or object. The reflectors can reflect the blue wavelength range and/or the ultraviolet wavelength range. In the case of the blue-light reflector, only the blue wavelength range of the spectrum (e.g., between 400 and 500 nanometers) is reflected. In the case of the ultraviolet reflector, only the ultraviolet wavelength range (e.g., between about 300 and 400 nanometers) emitted by the lamp is reflected.

Cold-light reflectors can excite emissive substances well since many emissive substances are excited by light in the wavelength range that is reflected by cold-light reflectors (i.e., 300 to 500 nanometers). Some white-light reflectors can excite emissive substances well since many emissive substances can be excited by light in the wavelength range that is reflected by the white-light reflectors (i.e, 400 to 700 nanometers). Light produced above these ranges is largely wasted since it may not produce the desired emission, produces additional heat, and can detract from the ability of an observer to see the emission wavelength. Thus, dichroic reflectors and faceted reflectors, which have narrow bandwidths of reflected light output can be used to provide proper excitation wavelengths for emissive substances and provide a precision not possible using other types of reflectors.

Lamps can also be effective at providing the wavelength range required to observe emission by providing strong intensities of light. In general, the narrower the beam spread, the greater the light power density (e.g., candle power per unit area; $mW/cm^2$) and the greater the intensity of created emission.

It is also possible to narrow the spectral output from reflector lamps by utilizing filters. Filters can be an integral part of the reflector unit or can be independent of the reflector lamp but used in conjunction with it. An LED light source can have a narrow spectral output that does not need to employ a filter.

In general, light output from the reflector and lamp is reduced to pass only the desired wavelength for the application. Optical filters can also be used for safety purposes. Suitable filters include absorption filters, dichroic filters, or interference filters. The dichroic filters operate on the principal of interference. These filters were designed to transmit the wavelength of light which can excite the emissive substance, for example, at the site of a leak (i.e., light in the blue wavelength range or ultraviolet wavelength range).

Suitable light sources can be identified by testing the average light power density of the light in the desired spectral region for excitation at fixed distances from the light outlet (e.g., at one foot, three foot, and five foot distances). The average light power density is measured using a detector that detects light in the excitation region (e.g., a 320-400 nm detector or a 400-500 nm detector). The detector can be a radiometer such as M007-004 or a blue hazard probe such as M007-027, available from UV Process Supply, Inc. A suitable light sources has an average light power density in the ultraviolet wavelength region of at least 0.1 mW/cm$^2$ (e.g., between 0.2 mW/cm$^2$ and 1 mW/cm$^2$) or in the blue wavelength region of at least 0.75 mW/cm$^2$ (e.g., between 1 mW/cm$^2$ and 50 mW/cm$^2$, preferably between 5 mW/cm$^2$ and 20 mW/cm$^2$) at a distance of two feet or more (e.g., three feet or five feet) from the light outlet.

Additionally, it may be possible to further enhance the detection of fluorescence by observing the fluorescence through a filter lens. The filter lens can be part of a shield or eyewear used by the user of a fluorescence leak detection system. The filter lens permits only light of certain wavelengths (e.g., the emission wavelength, but not the excitation wavelength) to pass and to be detected by the user. The filter lens can take several forms, including eyewear (e.g., glasses, or goggles), or shields (e.g., face shields). The filter lens can be designed to reduce or eliminate exposure of the observer to damaging ultraviolet radiation. Thus, the filter lens, when used in combination with filters, can lead to enhanced detection of fluorescence.

In another aspect, a method of manufacturing a light source includes providing a housing having a light outlet and an electrical input port, capable of accepting a variety of lamps, and selecting a lamp from the variety of lamps to fit within the light outlet of the housing. The lamp can be secured to the housing using a mounting cap, a voltage regulator is supplied to the housing to regulate a source of electricity to match the lamp, where the voltage regulator is electrically connected to the electrical input port. A switch is provided that reversibly connects the lamp to the source of electricity. The voltage regulator regulates an input voltage from the electrical input source to a voltage between 24 V and 1 V and can regulates the input voltage to 6 V to 3.5 V. Supplying a voltage regulator can include providing a voltage step down circuit in the housing. Securing the lamp to the housing using a mounting cap can include inserting a filter between the lamp and the mounting cap. Supplying a voltage regulator can also include providing a battery pack within the housing, and connecting the battery pack to a step down circuit. The battery pack can be a rechargeable battery pack.

In another aspect, a light source for examination of a substance which emits light at a wavelength greater than a wavelength of light emitted from the light source when the substance is excited by the wavelength of light emitted from the light source, the light source can include a housing having a light outlet capable of accepting a variety of lamps, a lamp oriented to emit light through the light outlet, the light source emitting an excitation wavelengths of light, a voltage regulator capable of supplying the correct voltage to the variety of lamps. The lamp can emit light of a wavelength within a predetermined range effective to enhance the detection of emission of light from a substance when the substance is excited by the wavelength of light emitted from the light source.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 6 is a drawing depicting an exploded view of an alternative embodiment of a light source having a parabolic reflector.

FIG. 10A-E are schematic views of one embodiment of a light source.

FIG. 11A-E are schematic views of one embodiment of a light source.

FIG. 12A-E are schematic view of one embodiment of a light source.

DETAILED DESCRIPTION

Figure 1:
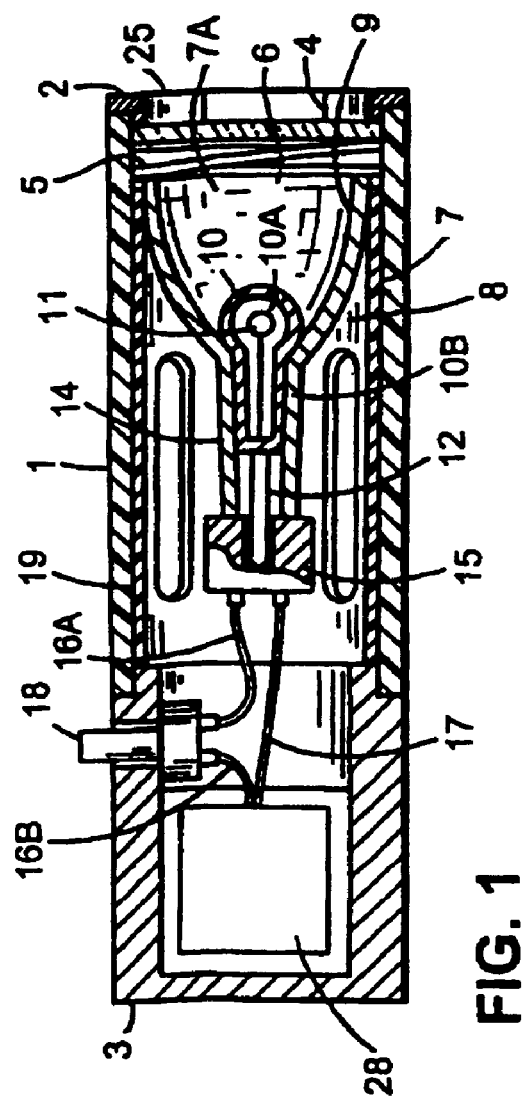
FIG. 1 is a drawing depicting a sectional view of one embodiment of a light source having parabolic reflector for examining substances which emit light at a wavelength greater than the wavelength of light emitted from the light source which excites the substance.
Figure 5:
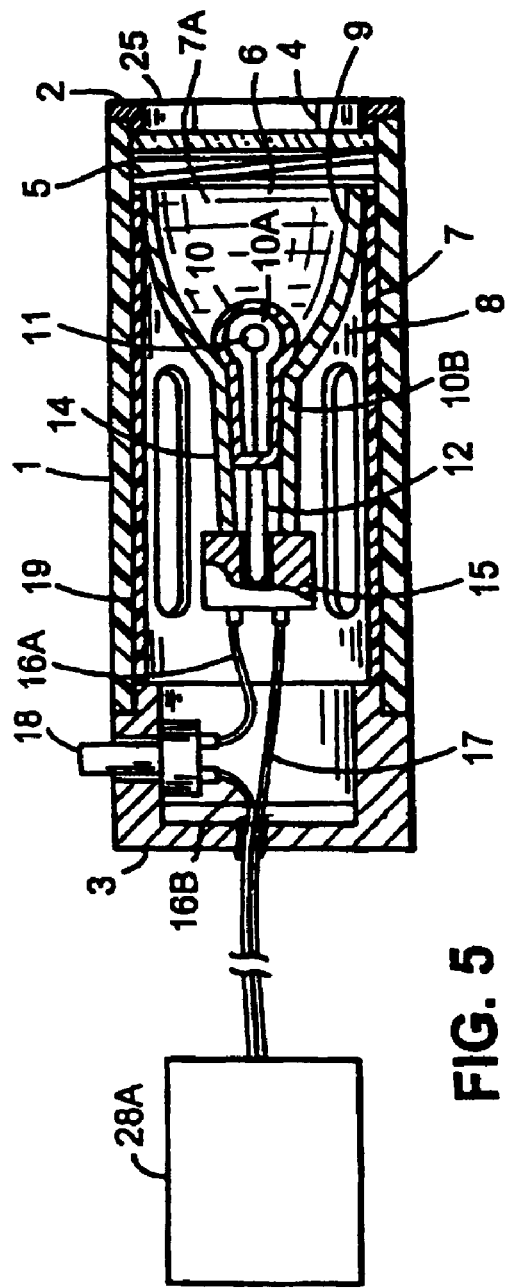
FIG. 5 is a drawing depicting a sectional view of a light source having parabolic reflector and a battery pack.
Figure 2:
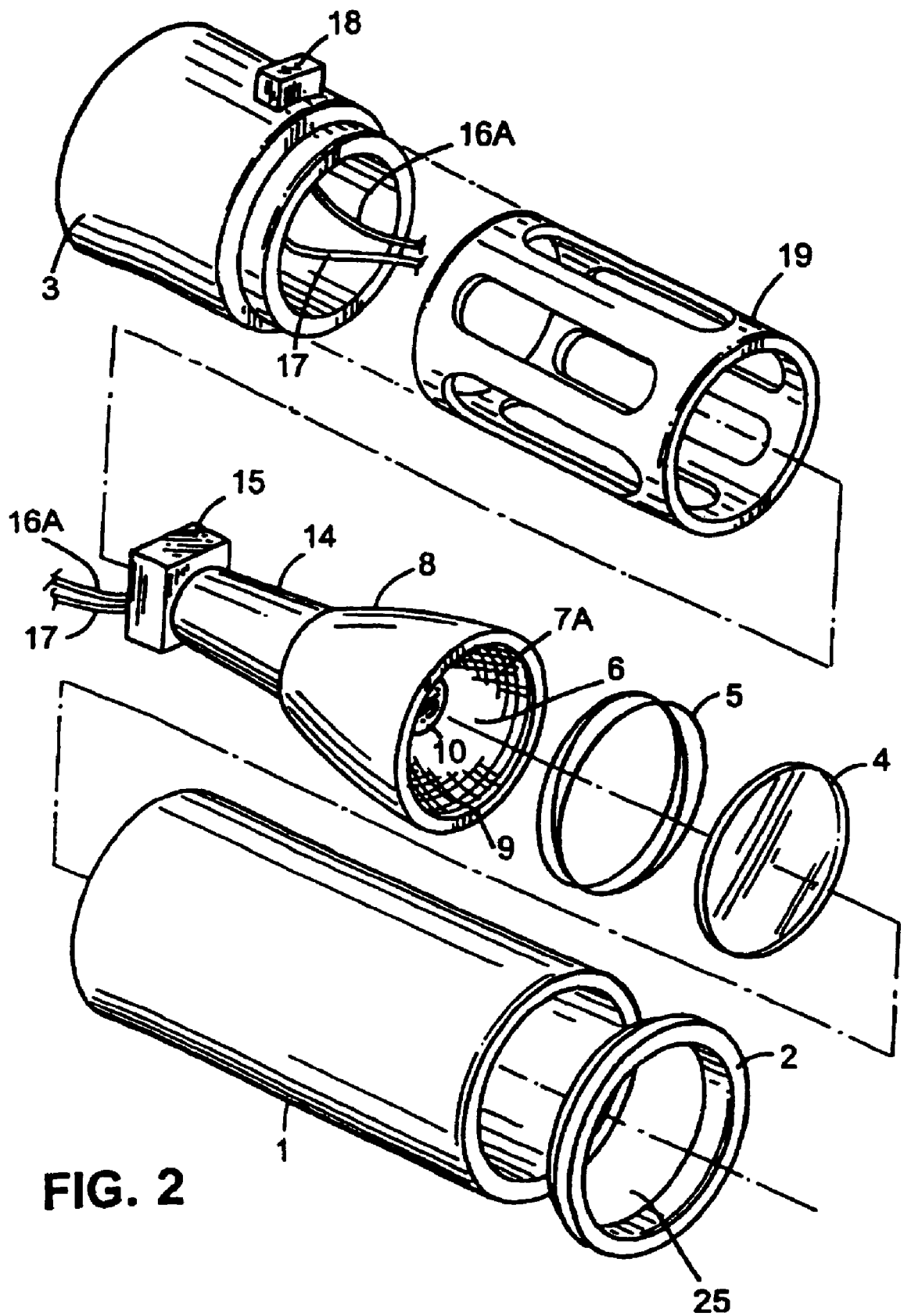
FIG. 2 is a drawing depicting an exploded view of one embodiment of a light source having a parabolic reflector.

Referring to FIGS. 1, 2 and 5, one embodiment of the light source consists of housing 1, which can be constructed of phenolic resin, plastic, or other suitable material. The unit is cylindrical in construction and hollow and has affixed at either end thereto front cap 2 and rear cap 3. Both caps can be constructed of aluminum or other suitable materials.

Front cap 2 includes light outlet 25 which allows light to exit from the light source. Front cap 2 has positioned directly behind it filter 4, such as, for example, a BSI lens filter, No. PS-600. This particular filter provides maximum transmission of light at a wavelength of approximately 400 nanometers, wherein about 82% of the light at that wavelength is transmitted through the filter lens. The filter can be made of glass. The filter generally transmits light in a wavelength range shorter that the emission wavelength of the emissive substance. In embodiments, the filter has a flat or a lens shape.

Located directly behind the filter 4 is compression spring 5 which aides in positioning the filter and reflector 6 in proper spatial relationship within the housing and further provides some shock-absorbing assistance.

Reflector 6 is a parabolic reflector. Reflector 6, located behind filter 4 and separated by compression spring 5, is a molded glass reflector, metal plated plastic reflector, or a polished metal reflector. The reflector can be a dichroic reflector or have a faceted surface. In certain embodiments, the reflector can be faceted and have a dichroic coating on its surface. The reflector can be a cold-light reflector. The parabolic reflector can be machined from metal (e.g., aluminum) or molded from glass or plastic. The surface of the reflector is polished. Suitable metal reflectors can be prepared from spun metal created off a parabolic mandrel. Alternatively, metal reflectors can be machined from an aluminum block. The inner surface is polished to create a highly reflective surface. Suitable plastic reflectors can be prepared by injection molding a plastic piece in a paraboloid form followed by deposition of metal onto the plastic to form a reflective surface. A glass reflector can be prepared by molding. A dichroic surface can be formed on the glass surface by sequential deposition of the interference layers.

The reflector has a reflective front surface 9. The surface can be configured to reflect visible light from the reflector. The surface can transmit heat through the reflector. The front surface 9 can be provided with facets 7A, while providing a uniform beam of illumination from lamp 10. Alternatively, front surface 9 can be smooth.

Lamp 10 and reflector 6 are chosen to provide a collimated beam. Extending from back surface 8 of reflector 6 is mounting portion 14. Lamp 10 is mounted in mounting portion 14 with the filament portion 10A extending beyond the front surface 9 of reflector 6. Lamp 10 has a filament portion 10A and a neck portion 10B. Included therein is filament 11, which is connected at its rear to terminal 12 and terminal 13 (not shown). (Terminal 13 is not visible in the view because it is parallel to terminal 12.)

Lamp 10 is aligned in the parabolic reflector to maximize the collimated nature of the light beam, so that a tightly collimated beam with a high light density can be produced. The position of the lamp in the reflector is adjusted so that the light from the lamp emanates from the area nearest the focal point of the paraboloid. For example, a target (consisting of concentric circles with cross hairs along the X and Y axes of the circles) is placed on a wall. The lamp is inserted into the reflector and the power is turned on so that the light strikes the target. The size of the beam on the target is noted. The position of the lamp in the reflector is incrementally adjusted until the size of the beam on the target is minimized. This position indicates the highest degree of collimation and optimum alignment.

Socket 15 receives terminals 12 and 13 provides connections to circuit conductors 16 and 17. Socket 15 is constructed of ceramic or similar material. Conductor portion 16A extends to on/off switch 18 and continues through conductor portion 16B to internal battery 28 or external battery pack 28A. The other conductor 17 extends directly from socket 15 to battery 28 or battery pack 28A.

The lamp, as described herein, typically operates from a source having a voltage of 12V or less. Preferably, the low-voltage lamp is a 4.5V, 6V, or 12V lamp. The lamp can draw, for example, approximately 20 watts of power using a 6V power source. The low-voltage lamp can be a high color temperature, low voltage bulb, such as, for example, a quartz halogen-xenon bulb. A high color temperature is a color temperature greater than 2600° K., preferably greater than 2900° K., more preferably greater than 3000° K., and most preferably greater than 3100° K. Suitable low-voltage lamps include, for example, 12V lamps XENOPHOT HLX 64610 (Sylvania) or PR-120 (JKL), 6V lamps XENOPHOT HLX 64250 (Sylvania), PSI-X631-LP (PSI) or PR-140 (JKL), and 4.5V lamps PSI-X4531-ELP (PSI) or PR-90 (JKL).

Lamp 10 can be bonded to mounting portion 14 by means of a suitable adhesive, such as a silicon or epoxy based adhesive. Assemblies having both the lamp and reflector include 50MR16OQ12NSP (12V, Sylvania), FRB 35MR16Q/8/NSP (Sylvania), 419905P AR-70 (Osram), PSI-RP30 (parabolic reflector, PSI), and PSI-RP20 (parabolic reflector, PSI).

The power source can consist of a battery 28, set of batteries, or battery pack 28A. The battery or battery pack can be disposable or rechargeable batteries. Alternatively, the power source can be a transformer that steps a 110V or 220V source down to a low-voltage suitable to power the low-voltage lamp.

Switch 18 is utilized to turn the light source on or off during usage of the present novel light source to permit detection of the substances which emit light at wavelengths greater than the wavelength of the light emitted from the light source used to excite the substance.

Heat shield 19 extends around the rear portion of reflector 6, mounting portion 14, and socket 15, and is held in place against the rear of reflector 6 by means of portions of rear cap 3. The heat shield assists in transmitting excess heat through the back surface 8 and neck portion 14 of reflector 6, which render the lamp assembly comfortable to the touch during operation.

Figure 3:
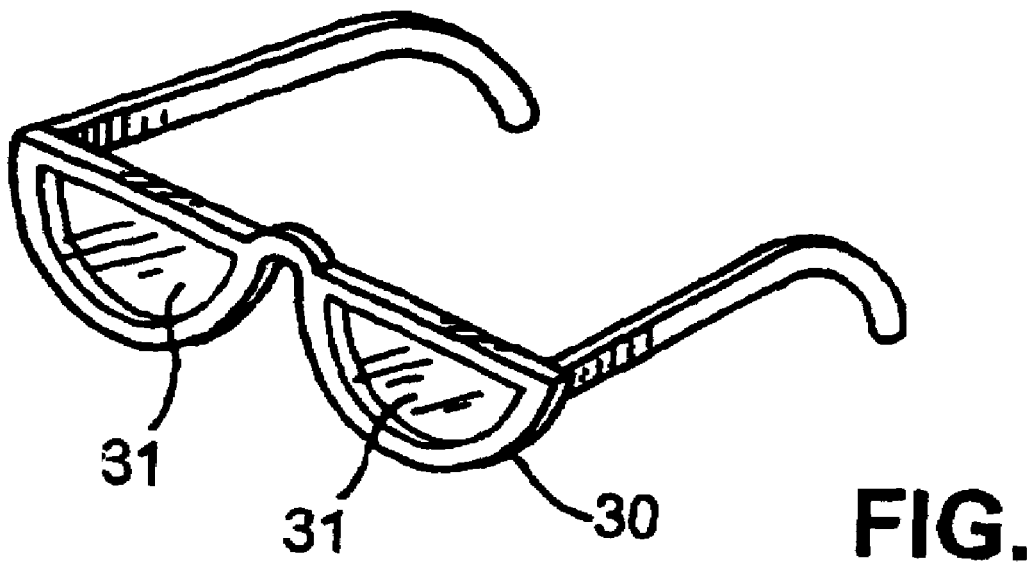
FIG. 3 is a drawing depicting a perspective view of eyewear including long wavelength pass material for use in conjunction with a light source.
Figure 4:
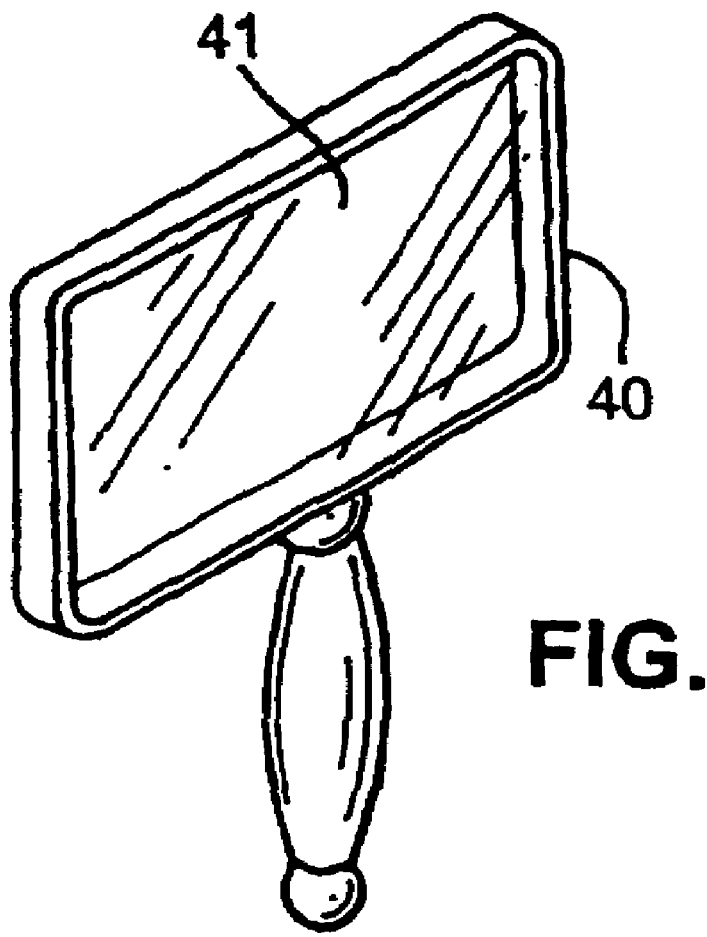
FIG. 4 is a drawing depicting a perspective view of a face shield including long wavelength pass material for use in conjunction with a light source.

Referring to FIGS. 3 and 4, detection of light emitted from the substance can be enhanced by viewing the fluorescence through filter lens 31 or 41. The filter lens can be a long wavelength pass material which reduces the amount of short wavelength light (e.g., the excitation wavelength) observed by the user or detector. In particular, filter lens 31 or 41 restricts the detection of wavelengths of light emitted from the light source. The filter lens permits only light of certain wavelengths (e.g., the emission wavelength) to pass and to be detected by the user. The filter lens can be housed in a shield 40 or eyewear 30. In embodiments, the filter lens allows wavelengths greater than the excitation wavelength to be observed.

In one example, the filter lens can include a trim filter in addition to the primary filter, which can reduce or eliminate noise that can lead to false negative test results (i.e., failing to detect a problem when the problem exists) when observing a fluorescence in non-destructive testing. The trim filter can block transmission of wavelengths that compete with detection of the emission wavelength from the dye. The trim filter can block a set of wavelengths different from the wavelengths blocked by the primary filter. The inclusion of a trim filter can facilitate use of a light source that emits light having a wavelength longer than the excitation wavelength. By permitting the light source to emit light having a broader emission range, the heat produced by the light source can be reduced and the cost of any filter associated with the light source can be reduced. For example, a light source can illuminate the test area with light of wavelengths up to 700 nm, when the filter lens includes a primary filter that blocks light in the range of 720 to 850 nm and a trim filter that blocks light from 650 to 850 nm. The primary filter can include a rose colored dye and the trim filter can include a blue colored dye. For example, the dyes can be Polymer Solutions 755 and Polymer Solutions 694, available from Polymer Solutions, Incorporated, Blacksburg, Va.

Referring to FIG. 6, another embodiment of the light source consists of housing 1, is cylindrical in construction and has front lip 2A and rear cap 3. Front lip 2A includes light outlet 25 which allows light to exit from the light source. Housing 1 has vents 60 that allow heat to escape from the light source. Filter 4 is positioned directly behind front lip 2A. O-ring 5A and compression spring 5 are positioned behind filter 4 to which aides in positioning filter 4 and reflector 6 in proper spatial relationship within the housing and can provide cushioning.

Reflector 6 is a parabolic reflector, located behind filter lens 4. The reflector has a reflective front surface 9 and can be provided with facets 7A. Lamp 10 is located within the reflector. Heat shield 19 extends around the rear portion of reflector 6, mounting portion 14, and socket 15, and is held in place against the rear of reflector 6 by means of portions of rear cap 3.

Lamp 10 and reflector 6 are chosen to provide a collimated beam. Lamp 10 is connected to socket 15, which provides connections to circuit conductors 16A and 17. Conductor portion 16A extends to switch 18 and continues through conductor portion 16B to a power source. For example, conductors 16B and 17 can be connected to clip 50 that can be attached to a transformer or battery.

The low-voltage lamp can be a light emitting diode (LED). The LED can emit wavelengths of light predominantly in the ultraviolet, violet, blue or green spectral range. The range of wavelengths emitted from the LED is narrow, typically less than 40 nm, preferably less than 35 nm. These LEDs can be used in a lamp without the need to use a filter lens because of the narrow wavelength range of the light emission. Alternatively, a white light LED can be used, in combination with a lens filter, such as an absorption filter or a dichroic filter. The LED can be powered by batteries, such as alkaline batteries, lithium batteries, or metal air batteries, or rechargeable batteries, such as lithium ion batteries or nickel metal hydride batteries. The LED can have a longer lifespan than an incandescent bulb. The battery used to power the LED can also last longer due to the low power consumption. Finally, the LED can have improved shock and vibration stability in comparison to an incandescent bulb. A single LED can be used in the light source. Alternatively, an array of LEDs, for example, 3-20 LEDs, preferably 4-16 LEDs, can be used in the light source.

The LED can be a diffused-type, which spreads light to a viewing angle of +/−35° from center or a non-diffused type, which produce light in a narrow viewing angle of less than +/−15° from center. The LED can be a gallium-based LED, such as, for example, a GaN, GaP:N, or other doped GaP LED. Suitable LEDs are commercially available, for example, from American Opto Plus LED, Inc. (San Dimas, Calif.), or Kwality Electronics Industries.

Low heat generating lamps can improve safety when detecting leaks. Low heat generating lamps do not produce heat that can burn a user of the light source or cause materials in the vicinity of the leak detection to ignite. The low heat generating light source can be an LED described above. The narrow range of wavelengths emitted from the LED can reduce infrared emissions. In addition, the low voltage required to produce light from the low-voltage light source can reduce resistive heating.

Figure 7:
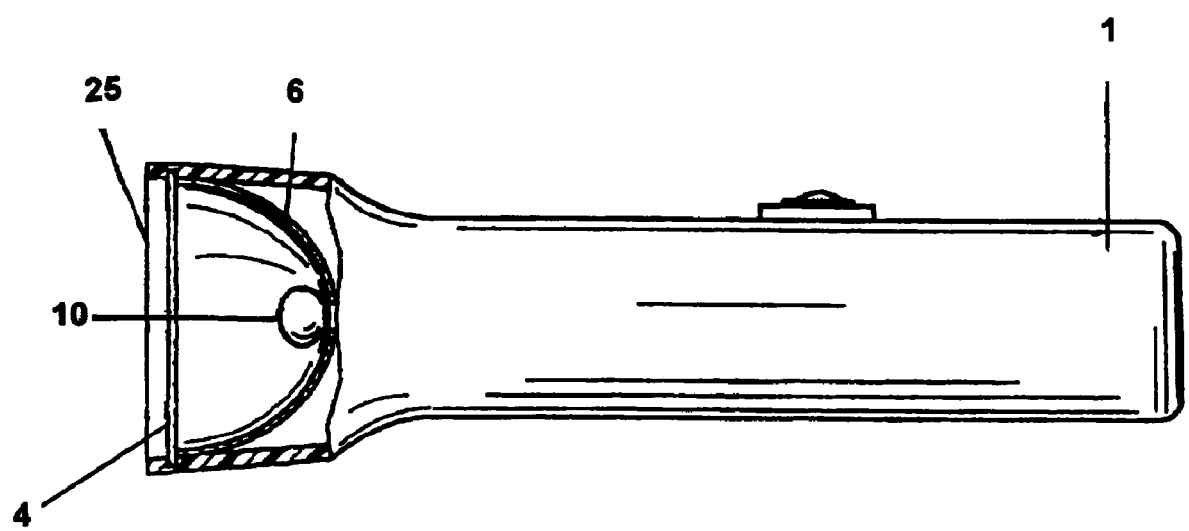
FIG. 7 is a drawing depicting a sectional view of one embodiment of a light source having a low-voltage light source.

Referring to FIG. 7, the light source includes housing 1, which contains low-voltage lamp 10 or low heat generating lamp 10. Low-voltage lamp 10 can be an LED, or an array of LEDs. Housing 1 can contain reflector 6, which can direct light emitted from lamp 10 out of light outlet 25. Light passing through outlet 25 can pass through filter 4.

FIG. 10-12 represent an alternative light source with different lamp types including, in part, circuitry designed to power lamps with voltages varying from 12 volts, to 6 volts, to 3.5 volts. Two exemplary circuit diagrams are presented as FIG. 8-9 that can be used to accommodate the different lamp types and voltages, and a rechargeable battery pack within the housing of the light source. Other circuits can be designed to perform the same function and are within the scope of this disclosure.

Figure 8:
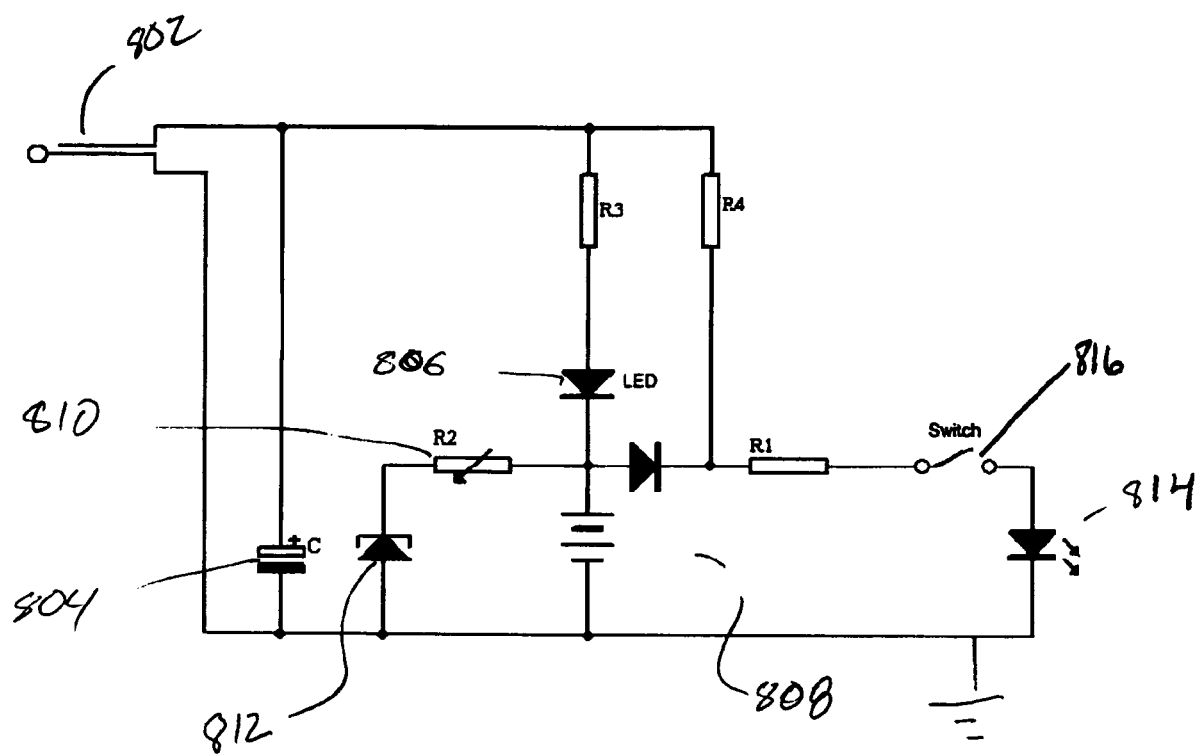
FIG. 8 is a circuit diagram for regulating the voltage supplied to one embodiment of a light source.

Referring to FIG. 8, electrical power is supplied to a power input jack 802 at an input voltage (e.g., 12 volts, DC). High-frequency transient currents are shunted through a capacitor 804. While power is supplied to the power input jack 802, LED 806 is illuminated to indicate that a rechargeable battery 808 is being charged. The rechargeable battery 804 can be, for example, a 6V NiMH battery. The combination of a resistor R3, LED 806, a variable resistor 810, and a zener diode 812 act as a voltage divider and voltage regulator to ensure that rechargeable battery 808 is charged at a desired charging voltage. When a switch 814 is closed, power is supplied through current limiting resistor R1 to a lamp 814 to light the lamp. When switch 816 is closed, power can be supplied to the lamp array 814 either from power at the input jack 802 or from power of the battery 808.

Figure 9:
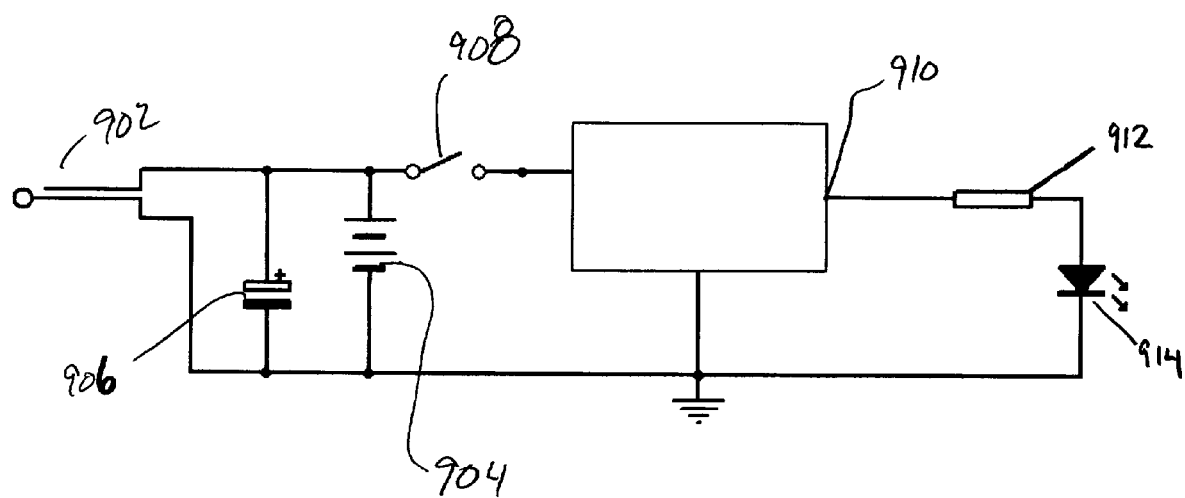
FIG. 9 is a circuit diagram for regulating the voltage supplied to one embodiment of a light source.

Referring to FIG. 9, electrical power is supplied to a power input jack 902 at an input voltage (e.g., 12 volts, DC) to charge a battery 904, while high-frequency transient currents are shunted through a capacitor 906. The battery can be, for example, one to three 1.2 volt batteries connected in series. When a switch 908 is closed, power is supplied to an amplifier LX-400, that supplies power at a lower voltage, for example, at 4 volts, an output 910 and through a resistor 912 to a lamp such as an LED array 914 to illuminate the array.

Referring to FIGS. 10A-E, a light source 1000 includes a housing 1005, which contains a low voltage lamp 1010. Low voltage lamp 1010 can be a 12 V lamp attached to a 12 V power supply using electrical supply jack 1020. The 12 V power supply can be a transformer that converts 110V AC input, or an automobile battery. Switch 1030 reversibly connects the circuit that supplies the lamp with power. Housing 1000 can include a battery pack 1040 to power the lamp. Housing 1000 includes a mounting cap 1050 for mounting the lamp 1010 into the housing 1000. Lens 1060 rests between the mounting cap 1050, and the lamp 1010. Lens 1060 can be a filter lens. Lamp 1010 can include a reflector 1070 for reflecting the emitted light. The reflector can be faceted or smooth, parabolic or elliptical, and can be a dichroic reflector. The housing can have vents 1080 adjacent to the lamp 1010 to help with heat removal if necessary. A lamp suitable for this embodiment would be, for example, a quartz halogen-xenon lamp such as 50MR160Q12NSP (12V, Sylvania) or an MR-16.

Referring to FIG. 11A-E, a light source 1100 includes a housing 1110, which contains an array of low voltage light emitting diodes (LEDs) 1120. The array can include 2 to 36, 4 to 24 or 6 to 18 LEDs. Each of the LEDs 1120 can emit wavelengths of light predominantly in the ultraviolet, violet, blue or green spectral range. The lamp can include a reflector (not shown). The range of wavelengths emitted from the LED is narrow, typically less than 40 nm, preferably less than 35 nm. These LEDs can be used in a lamp without the need to use a filter lens because of the narrow wavelength range of the light emitted. The housing 1110 can include a jack 1130 for connecting to an external electrical supply source, and can include a rechargeable a battery pack 1140. The housing 1110, can, optionally, include a lens 1150, and can include a mounting cap 1160. Switch 1170 reversibly connects the lamp to an electrical supply source such as a 3.5 to 4 V source as shown in FIG. 8, which in turn is powered by a 6 V battery pack 1140. The electrical supply source can be variable and can be stepped down by circuitry internal to the housing 1110.

Referring to FIG. 12A-E, a light source 1200 includes a housing 1205 containing a single LED lamp 1210. The LED 1210 can emit wavelengths of light predominantly in the ultraviolet, violet, blue or green spectral range. The lamp can have it's own reflector and its own lens(not shown). The range of wavelengths emitted from a LED is narrow, typically less than 40 nm, preferably less than 35 nm. The housing 1205 can include a jack 1230 for connecting to an external electrical supply source, and can include a rechargeable battery pack 1240. The power source can be a 5.6-24 V power source. The housing 1205, can include a lens 1250, and a mounting cap 1260. Switch 1270 reversibly connects the lamp to an electrical supply source such as to the battery pack 1240. The electrical supply source can be variable and can be stepped down by circuitry internal to the housing 1210. The lamp in this embodiment can be for example, an OptiLED™ MR-16 Spot Lamp, available from OptiLED North America, Irvine, Calif. These lamps have variable lens configurations and can include diffusers for more equal illumination and also function under variable voltages.

A number of embodiments of the invention have been described. Nevertheless, it will be understood that various modifications may be made without departing from the spirit and scope of the invention. Accordingly, other embodiments are within the scope of the following claims.

What is claimed is:

1. A method of manufacturing a light source comprising: providing a housing having a light outlet and an electrical input port, capable of accepting a variety of lamps; selecting a lamp from the variety of lamps to fit within the light outlet of the housing; securing the lamp to the housing using a mounting cap; supplying a voltage regulator to the housing to regulate a source of electricity to match the lamp wherein supplying a voltage regulator includes providing a voltage step down circuit in the housing, the voltage regulator being electrically connected to the electrical input port; and providing a switch that reversibly connects the lamp to the source of electricity.

2. The method of claim 1 wherein the lamp is a low voltage lamp.

3. The method of claim 1 wherein the voltage regulator regulates an input voltage from the electrical input source to a voltage between 24 V and 1 V.

4. The method of claim 3 wherein the voltage regulator regulates the input voltage to 6 V to 3.5 V.

5. The method of claim 1 wherein the lamp includes a light emitting diode.

6. The method of claim 1 wherein the lamp includes an array of light emitting diodes.

7. The method of claim 1 wherein the lamp is a high color temperature low voltage bulb.

8. The method of claim 1 wherein the bulb is a quartz halogen-xenon bulb.

9. The method of claim 1 wherein securing the lamp to the housing using a mounting cap includes inserting a filter between the lamp and the mounting cap.

10. The method of claim 1 wherein supplying a voltage regulator includes: providing a battery pack within the housing; and connecting the battery pack to a step down circuit.

11. The method of claim 10 wherein the battery pack is a rechargeable battery pack.

12. The method of claim 1 wherein the lamp includes a reflector.

13. The method of claim 12 wherein the reflector is parabolic.

14. The method of claim 12 wherein the reflector is smooth.

15. The method of claim 12 wherein the reflector is faceted.

16. The method of claim 12 wherein the reflector is dichroic.

17. The method of claim 9 wherein the filter is a dichroic filter.

18. The method of claim 1 wherein the lamp is a low heat lamp.

19. A light source for examination of a substance which emits light at a wavelength greater than a wavelength of light emitted from the light source when the substance is excited by the wavelength of light emitted from the light source, the light source comprising: a housing having a light outlet capable of accepting a variety of lamps; a lamp oriented to emit light through the light outlet, the light source emitting an excitation wavelengths of light; and a voltage regulator capable of supplying the correct voltage to the variety of lamps wherein the voltage regulator includes a voltage step down circuit in the housing.

20. The light source of claim 19 wherein the lamp emits light of a wavelength within a predetermined range effective to enhance the detection of emission of light from a substance when the substance is excited by the wavelength of light emitted from the light source.

21. The light source of claim 19 wherein the lamp includes a light emitting diode.

22. The light source of claim 19 wherein the lamp is an array of light emitting diodes.

23. The light source of claim 19 wherein the lamp is a quartz halogen-xenon lamp.

* * * * *